US012717403B1

(12) United States Patent
Ghavam et al.

(10) Patent No.: US 12,717,403 B1
(45) Date of Patent: Aug. 25, 2026

(54) RENDERING AUXILIARY VIEWS FOR AN ELECTRONIC DEVICE

(71) Applicant: Apple Inc., Cupertino, CA (US)

(72) Inventors: Borna Ghavam, San Francisco, CA (US); Jay Mayur Khandhar, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 18/622,641

(22) Filed: Mar. 29, 2024

Related U.S. Application Data

(60) Provisional application No. 63/493,438, filed on Mar. 31, 2023.

(51) Int. Cl.
*G06F 3/01* (2006.01)

(52) U.S. Cl.
CPC .................................... *G06F 3/012* (2013.01)

(58) Field of Classification Search
CPC ....................................................... G06F 3/012
See application file for complete search history.

(56) References Cited

U.S. PATENT DOCUMENTS 10,146,302 B2 * 12/2018 Tokubo ................. A63F 13/213
10,555,192 B2 2/2020 Yang et al.
11,423,507 B2 8/2022 Appu et al.
11,439,917 B2 9/2022 Benedetto et al.
11,563,513 B1 * 1/2023 Lohr ....................... G06F 3/011
11,914,763 B1 * 2/2024 Boggs ..................... G06T 19/20
12,283,265 B1 * 4/2025 Sumberg ................ G10K 15/02
2011/0176616 A1 * 7/2011 Luthra .................. H04N 19/61 375/E7.243
2011/0310235 A1 * 12/2011 Sasaki ................. H04N 13/189 348/54
2012/0128221 A1 * 5/2012 Lazebnik .............. A61B 8/485 382/131
2013/0050183 A1 * 2/2013 Wang .................. H04N 13/161 345/419
2013/0050423 A1 * 2/2013 Hulyalkar ........... H04N 13/275 348/43
2015/0062284 A1 * 3/2015 Rangan .................... H04N 7/15 348/14.08
2017/0280090 A1 * 9/2017 Raskin ................... H04N 13/30
2017/0367771 A1 * 12/2017 Tako ..................... G06T 19/003
2017/0374344 A1 * 12/2017 Boulton .................. G06T 19/00

(Continued)

*Primary Examiner* — Dmitriy Bolotin
(74) *Attorney, Agent, or Firm* — Treyz Law Group, P.C.; Joseph F. Guihan

(57) ABSTRACT

A head-mounted device may be paired with an electronic device. In a remote rendering arrangement, content for the head-mounted device may be rendered by the paired electronic device and wirelessly transmitted from the paired electronic device to the head-mounted device to be subsequently displayed. Remote rendering shifts some of the processing burden (and therefore power consumption) for operating the display on the head-mounted device to the paired electronic device. In a pre-rendering scheme, auxiliary views of virtual content may be rendered for a given display frame. Pre-rendering may mitigate artifacts caused by latency. However, pre-rendering may require additional network bandwidth. Therefore, pre-rendering may only be performed when the network strength of the wireless connection between the head-mounted device and the paired electronic device is sufficiently strong.

16 Claims, 5 Drawing Sheets

(56) References Cited

U.S. PATENT DOCUMENTS

2018/0041750 A1* 2/2018 Kim ........................ G06F 18/24
2018/0053284 A1* 2/2018 Rodriguez ................ G06T 5/80
2018/0315248 A1* 11/2018 Bastov ................ G06F 3/04815
2020/0112625 A1 4/2020 Hancock et al.
2021/0142145 A1* 5/2021 Bastani ................ G06N 3/0464
2021/0199960 A1 7/2021 Singh et al.
2022/0276696 A1* 9/2022 Brown .................. G06F 3/1423
2022/0287676 A1* 9/2022 Steines .................. A61B 90/37
2022/0414973 A1* 12/2022 Daly ....................... G06F 3/016
2024/0103615 A1* 3/2024 Huergo Wagner ..... G06F 3/012
2024/0154915 A1* 5/2024 Chan ..................... H04L 49/901
2024/0179327 A1* 5/2024 Raghoebardajal ...... G01P 15/02
2024/0192492 A1* 6/2024 Kim ........................ G06F 3/165
2024/0334235 A1* 10/2024 Ghavam ............... H04W 24/02
2025/0076969 A1* 3/2025 Xiong ..................... G06F 3/013
2025/0299367 A1* 9/2025 Xiong ................... G06T 19/006

* cited by examiner

RENDERING AUXILIARY VIEWS FOR AN ELECTRONIC DEVICE

This application claims the benefit of U.S. provisional patent application No. 63/493,438 filed Mar. 31, 2023, which is hereby incorporated by reference herein in its entirety.

BACKGROUND

This relates generally to electronic devices, and, more particularly, to electronic devices with displays.

Some electronic devices such as head-mounted devices include displays that are positioned close to a user's eyes during operation (sometimes referred to as near-eye displays). The displays may present three-dimensional content to the user. If care is not taken, latency may cause artifacts and/or discomfort to a user viewing images on the head-mounted device.

SUMMARY

A method of operating an electronic device that is configured to wirelessly communicate with a head-mounted device may include rendering a first view of content for a primary viewing angle for a display frame, rendering a second view of the content for an additional viewing angle that is different than the primary viewing angle for the display frame, and wirelessly transmitting the first view and the second view to the head-mounted device.

A method of operating an electronic device that is configured to wirelessly communicate with a head-mounted device may include, for a first display frame and while a wireless connection between the electronic device and the head-mounted device has a first strength, rendering only a single view of content and wirelessly transmitting the single view of the content to the head-mounted device and, for a second display frame and while the wireless connection between the electronic device and the head-mounted device has a second strength that is greater than the first strength, rendering multiple views of the content and wirelessly transmitting the multiple views of the content to the head-mounted device.

A method of operating a head-mounted device that is configured to wirelessly communicate with an electronic device may include gathering head pose information using an accelerometer, wirelessly transmitting the head pose information to the electronic device, wirelessly receiving, from the electronic device, multiple rendered views of content that are based on the head pose information, that are associated with a given display frame, and that each have an associated unique viewing angle, and presenting content for the given display frame using the multiple rendered views.

DETAILED DESCRIPTION

Figure 1:
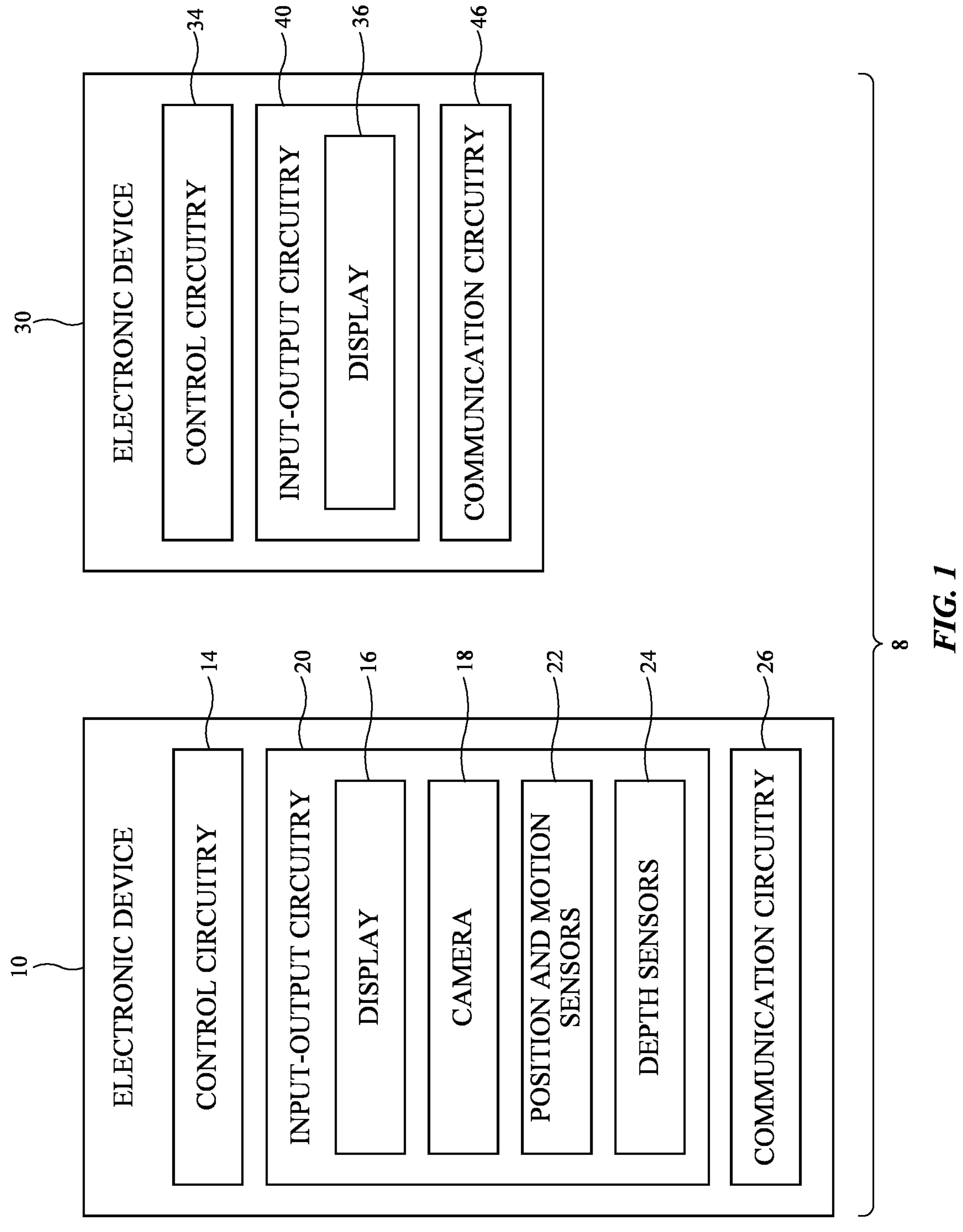
FIG. 1 is a schematic diagram of an illustrative system with first and second electronic devices in accordance with some embodiments.

Head-mounted devices may display different types of extended reality (XR) content for a user. The head-mounted device may display a virtual object that is perceived at an apparent depth within the physical environment of the user. Virtual objects may sometimes be displayed at fixed locations relative to the physical environment of the user. For example, consider an example where a user's physical environment includes a table. A virtual object may be displayed for the user such that the virtual object appears to be resting on the table. As the user moves their head and otherwise interacts with the XR environment, the virtual object remains at the same, fixed position on the table (e.g., as if the virtual object were another physical object in the XR environment). This type of content may be referred to as world-locked content (because the position of the virtual object is fixed relative to the physical environment of the user).

Other virtual objects may be displayed at locations that are defined relative to the head-mounted device or a user of the head-mounted device. First, consider the example of virtual objects that are displayed at locations that are defined relative to the head-mounted device. As the head-mounted device moves (e.g., with the rotation of the user's head), the virtual object remains in a fixed position relative to the head-mounted device. For example, the virtual object may be displayed in the front and center of the head-mounted device (e.g., in the center of the device's or user's field-of-view) at a particular distance. As the user moves their head left and right, their view of their physical environment changes accordingly. However, the virtual object may remain fixed in the center of the device's or user's field of view at the particular distance as the user moves their head (assuming gaze direction remains constant). This type of content may be referred to as head-locked content. The head-locked content is fixed in a given position relative to the head-mounted device (and therefore the user's head which is supporting the head-mounted device). The head-locked content may not be adjusted based on a user's gaze direction. In other words, if the user's head position remains constant and their gaze is directed away from the head-locked content, the head-locked content will remain in the same apparent position.

Second, consider the example of virtual objects that are displayed at locations that are defined relative to a portion of the user of the head-mounted device (e.g., relative to the user's torso). This type of content may be referred to as body-locked content. For example, a virtual object may be displayed in front and to the left of a user's body (e.g., at a location defined by a distance and an angular offset from a forward-facing direction of the user's torso), regardless of which direction the user's head is facing. If the user's body is facing a first direction, the virtual object will be displayed in front and to the left of the user's body. While facing the first direction, the virtual object may remain at the same, fixed position relative to the user's body in the XR environment despite the user rotating their head left and right (to look towards and away from the virtual object). However, the virtual object may move within the device's or user's field of view in response to the user rotating their head. If the user turns around and their body faces a second direction that is the opposite of the first direction, the virtual object will be repositioned within the XR environment such that it is still displayed in front and to the left of the user's body. While facing the second direction, the virtual object may remain at the same, fixed position relative to the user's body in the XR environment despite the user rotating their head left and right (to look towards and away from the virtual object).

In the aforementioned example, body-locked content is displayed at a fixed position/orientation relative to the user's body even as the user's body rotates. For example, the virtual object may be displayed at a fixed distance in front of the user's body. If the user is facing north, the virtual object is in front of the user's body (to the north) by the fixed distance. If the user rotates and is facing south, the virtual object is in front of the user's body (to the south) by the fixed distance.

Alternatively, the distance offset between the body-locked content and the user may be fixed relative to the user whereas the orientation of the body-locked content may remain fixed relative to the physical environment. For example, the virtual object may be displayed in front of the user's body at a fixed distance from the user as the user faces north. If the user rotates and is facing south, the virtual object remains to the north of the user's body at the fixed distance from the user's body.

Body-locked content may also be configured to always remain gravity or horizon aligned, such that head and/or body changes in the roll orientation would not cause the body-locked content to move within the XR environment. Translational movement may cause the body-locked content to be repositioned within the XR environment to maintain the fixed distance from the user. Subsequent descriptions of body-locked content may include both of the aforementioned types of body-locked content.

An illustrative system with one or more electronic devices is shown in FIG. 1. System 8 includes electronic devices 10 and 30. Each one of electronic devices 10 and 30 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or ear-piece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Each one of electronic devices 10 and 30 may have the shape of a pair of eyeglasses (e.g., supporting frames), may form a housing having a helmet shape, or may have other configurations to help in mounting and securing the components of one or more displays on the head or near the eye of a user.

In one illustrative configuration that will be described herein, electronic device 10 is a head-mounted device and electronic device 30 is not a head-mounted device (e.g., a cellular telephone, a laptop computer, a watch, a tablet, etc.).

As shown in FIG. 1, electronic device 10 (sometimes referred to as head-mounted device 10, system 10, head-mounted display 10, etc.) may have control circuitry 14. Control circuitry 14 may be configured to perform operations in electronic device 10 using hardware (e.g., dedicated hardware or circuitry), firmware and/or software. Software code for performing operations in electronic device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Electronic device 10 may include input-output circuitry 20. Input-output circuitry 20 may be used to allow a user to provide electronic device 10 with user input and/or to gather information on the environment in which electronic device 10 is operating. Output components in circuitry 20 may allow electronic device 10 to provide a user with output.

As shown in FIG. 1, input-output circuitry 20 may include a display such as display 16. Display 16 may be used to display images for a user of electronic device 10. Display 16 may be a see-through (transparent) display so that a user may observe physical objects through the display while computer-generated content is overlaid on top of the physical objects by presenting computer-generated images on the display. A transparent display may be formed from a transparent pixel array (e.g., a transparent organic light-emitting diode display panel) or may be formed by a display device that provides images to a user through a beam splitter, holographic coupler, or other optical coupler (e.g., a display device such as a liquid crystal on silicon display). Alternatively, display 16 may be an opaque display that blocks light from physical objects when a user operates electronic device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 16 is opaque, the display may also optionally display entirely computer-generated content (e.g., without displaying images of the physical environment).

Display 16 may include one or more optical systems (e.g., lenses) (sometimes referred to as optical assemblies) that allow a viewer to view images on display(s) 16. A single display 16 may produce images for both eyes or a pair of displays 16 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules (sometimes referred to as display assemblies) that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Input-output circuitry 20 may include various other input-output devices. For example, input-output circuitry 20 may include one or more cameras 18. Cameras 18 may include one or more outward-facing cameras (that face the physical environment around the user when the electronic device is mounted on the user's head, as one example). Cameras 18 may capture visible light images, infrared images, or images of any other desired type. The cameras may be stereo cameras if desired. Outward-facing cameras may capture pass-through video for device 10. Cameras 18 may include inward-facing cameras that capture gaze detection information.

As shown in FIG. 1, input-output circuitry 20 may include position and motion sensors 22 (e.g., compasses, gyroscopes, accelerometers, and/or other devices for monitoring the location, orientation, and movement of electronic device 10, satellite navigation system circuitry such as Global Positioning System circuitry for monitoring user location, etc.). Using sensors 22, for example, control circuitry 14 can monitor the current direction in which a user's head is oriented relative to the surrounding environment (e.g., a user's head pose). The cameras in cameras 18 may also be considered part of position and motion sensors 22. The outward-facing cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique).

Input-output circuitry 20 may include one or more depth sensors 24. Each depth sensor may be a pixelated depth sensor (e.g., that is configured to measure multiple depths across the physical environment) or a point sensor (that is configured to measure a single depth in the physical environment). Each depth sensor (whether a pixelated depth sensor or a point sensor) may use phase detection (e.g., phase detection autofocus pixel(s)) or light detection and ranging (LIDAR) to measure depth. Any combination of depth sensors may be used to determine the depth of physical objects in the physical environment.

Input-output circuitry 20 may also include other sensors and input-output components if desired (e.g., gaze tracking sensors, ambient light sensors, force sensors, temperature sensors, touch sensors, image sensors for detecting hand gestures or body poses, buttons, capacitive proximity sensors, light-based proximity sensors, other proximity sensors, strain gauges, gas sensors, pressure sensors, moisture sensors, magnetic sensors, microphones, speakers, audio components, haptic output devices such as actuators, light-emitting diodes, other light sources, etc.).

Head-mounted device 10 may also include communication circuitry 26 to allow the head-mounted device to communicate with external equipment such as electronic device 30 (e.g., a tethered computer, a portable device such as a handheld device, watch, or laptop computer, or other electrical equipment). Communication circuitry 26 may be used for both wired and wireless communication with external equipment such as electronic device 30.

Communication circuitry 26 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

The radio-frequency transceiver circuitry in wireless communications circuitry 26 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands.

The radio-frequency transceiver circuitry may include millimeter/centimeter wave transceiver circuitry that supports communications at frequencies between about 10 GHz and 300 GHz. For example, the millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, the millimeter/centimeter wave transceiver circuitry may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, the millimeter/centimeter wave transceiver circuitry may support IEEE 802.11ad communications at 60 GHz (e.g., WiGig or 60 GHz Wi-Fi bands around 57-61 GHz), and/or $5^{th}$ generation mobile networks or $5^{th}$ generation wireless systems (5G) New Radio (NR) Frequency Range 2 (FR2) communications bands between about 24 GHz and 90 GHz.

Antennas in wireless communications circuitry 26 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link and another type of antenna may be used in forming a remote wireless link antenna.

Electronic device 10 may be paired with electronic device 30. In other words, a wireless link may be established between electronic devices 10 and 30 to allow fast and efficient communication between devices 10 and 30. Electronic devices 10 and 30 may be associated with the same user (e.g., may be logged into a cloud service using the same user ID), may exchange wireless communications, etc. As previously described, electronic device 10 may be a head-mounted device whereas electronic device 30 is a paired electronic device such as a cellular telephone, watch, laptop computer, tablet, etc. In other possible embodiments, electronic device 10 may wirelessly communicate with an external server (e.g., device 30 may be an external server).

Electronic device 30 may include control circuitry 34, input-output circuitry 40, display 36, and communication circuitry 46. Control circuitry 34 and communication circuitry 46 may have the same features and capabilities as the corresponding components in electronic device 10 and, for simplicity, the descriptions thereof will not be repeated. Display 36 may be an organic light-emitting diode display or other display based on an array of light-emitting diodes, a liquid crystal display, a liquid-crystal-on-silicon display, a projector or display based on projecting light beams on a surface directly or indirectly through specialized optics (e.g., digital micromirror devices), an electrophoretic display, a plasma display, an electrowetting display, or any other desired display. Input-output circuitry 40 may include any other desired components (e.g., cameras, position and motion sensors, depth sensors, gaze tracking sensors, ambient light sensors, force sensors, temperature sensors, touch sensors, image sensors for detecting hand gestures or body poses, buttons, capacitive proximity sensors, light-based proximity sensors, other proximity sensors, strain gauges, gas sensors, pressure sensors, moisture sensors, magnetic sensors, microphones, speakers, audio components, haptic output devices such as actuators, light-emitting diodes, other light sources, etc.).

Each one of electronic devices 10 and 30 may include a battery. Head-mounted device 10 may have a battery with a lower total capacity than electronic device 30 in one embodiment.

If desired, content for display 16 on head-mounted device 10 may be rendered by electronic device 30 and wirelessly transmitted from electronic device 30 to head-mounted device 10 to subsequently be displayed. Rendering display content for a first electronic device using a second electronic device may sometimes be referred to herein as remote rendering. Remote rendering may be useful in mitigating the power consumption on one electronic device. For example, it may be desirable to mitigate the power consumption on head-mounted device 10. Remote rendering shifts some of the processing burden (and therefore power consumption) for operating display 16 on electronic device 10 to electronic device 30.

In some cases, a graphics processing unit (GPU) in electronic device 30 (e.g., in control circuitry 34) may be capable of more complex rendering operations than a graphics processing unit in electronic device 10 (e.g., in control circuitry 14). In this case, remote rendering may allow for more complex display data to be rendered than if head-mounted device 10 only used its local GPU.

Instead or in addition to the GPU in electronic device 30 being capable of more complex rendering operations than a GPU in electronic device 10, electronic device 30 may have a central processing unit (CPU), memory, and/or overall system capabilities that enable electronic device 30 to perform more complex rendering operations than electronic device 10. In this case, remote rendering may allow for more complex display data to be rendered than if head-mounted device 10 performed the rendering.

Figure 2:
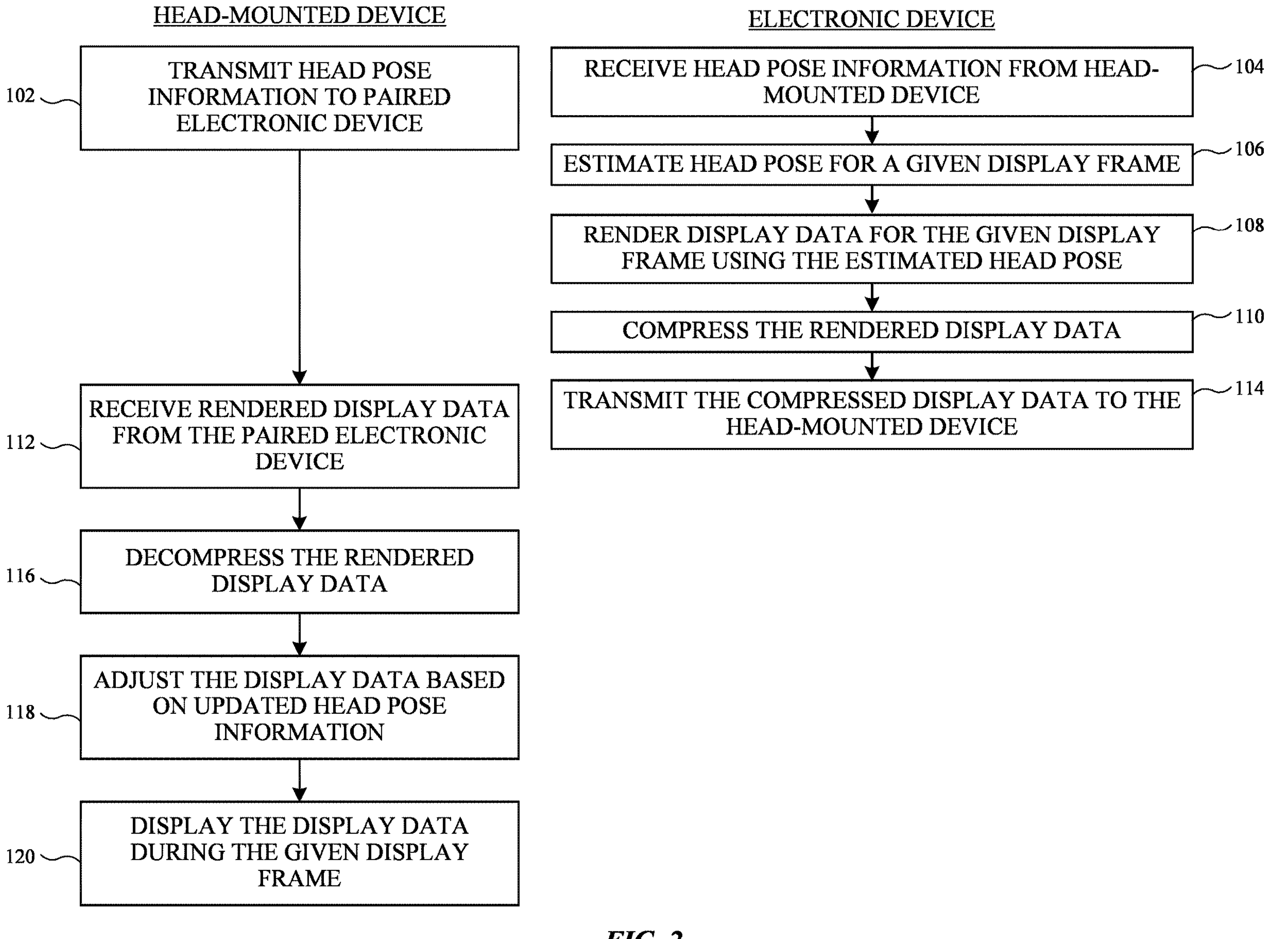
FIG. 2 is a flowchart showing illustrative method steps performed by a head-mounted device and a paired electronic device in a remote rendering arrangement in accordance with some embodiments.

FIG. 2 is a flowchart of illustrative method steps performed by a head-mounted device and a paired electronic device in a remote rendering arrangement. As shown, the steps on the left (e.g., steps 102, 112, 116, 118, and 120) are performed by a first electronic device such as head-mounted device 10 in FIG. 1. The steps on the right (e.g., steps 104, 106, 108, 110, and 114) are performed by a second electronic device such as electronic device 30 in FIG. 1. The two devices in FIG. 2 may be paired and may exchange wireless communications.

At step 102, head-mounted device 10 may transmit head pose information to the paired electronic device 30. The head-mounted device 10 may obtain the head pose information using position and motion sensors 22, as one example. The head-mounted device 10 may wirelessly transmit the head pose information (e.g., using Bluetooth communications). The head-mounted device 10 may transmit a single head pose for a single point in time, or multiple head poses associated with different points in time. In other words, the head-mounted device 10 may transmit one or more head poses, with each head pose having a corresponding time stamp. In general, the transmitted head pose information may include any desired additional sensor information, contextual information, historical data, etc.

At step 104, electronic device 30 may receive the head pose information from the paired head-mounted device 10. Electronic device 30 subsequently uses the received head pose information to estimate the head pose for a given display frame at step 106. Electronic device 30 may estimate the head pose for a given display frame using historical head pose information for head-mounted device 10 that is stored at electronic device 30. For example, the head pose information from head-mounted device 104 may identify a first head pose at a first time ($t_1$), a second head pose at a second time ($t_2$), and a third head pose at a third time ($t_3$). The estimated time for the display of the given display frame is $t_4$. The electronic device uses the head poses over time at $t_1$, $t_2$, and $t_3$ to predict the head pose at $t_4$. Electronic device 30 may use any desired number of head poses (e.g., one or more) to predict the head pose at $t_4$.

At step 108, the electronic device 30 may render display data for the given display frame using the estimated head pose from step 106. The electronic device 30 may render the display data using a graphics processing unit or any other desired computing resources. The rendered display data may subsequently be compressed at step 110. The compressed display data is then wirelessly transmitted to the paired head-mounted device at step 114. The compression techniques used at step 110 may include using multiple rendered views together (e.g., using one view to predict the next), semantic coding, and/or any other desired compression techniques.

At step 112, head-mounted device 10 may receive the rendered display data from the paired electronic device. The received rendered display data may have an associated target head pose (e.g., the fourth head pose for time $t_4$ using the example above). At step 116, head-mounted device 10 may decompress the rendered display data. In general, any desired encoding/decoding scheme may be used for the compression and decompression of the display data.

At step 118, the head-mounted device may adjust the display data based on updated head pose information. As previously mentioned, the rendered display data may be rendered for a predicted head pose by electronic device 30. Head-mounted device 10 may revise the head pose estimation for the given display frame based on head pose data that has been obtained between step 102 (when the head pose information is transmitted to device 30) and step 118.

In the previous example, electronic device 30 renders display data for an estimated fourth head pose at the target time $t_4$ for the given display frame. At step 118, head-mounted device 10 may estimate a fifth head pose at the target time $t_4$ using updated head pose information gathered using position and motion sensors 22. At step 118, head-mounted device 10 therefore adjusts the display data to compensate for a difference between the originally predicted head pose (e.g., the fourth head pose) and the newly predicted head pose (e.g., the fifth head pose). Adjusting the display data to compensate for the difference between the originally predicted head pose and the newly predicted head pose may include reprojecting the display data to the newly predicted head pose.

Finally, at step 120, head-mounted device 10 may display the display data for the given frame using display 16. If desired, steps 118 and 120 (e.g., adjusting the display data based on head pose information and displaying the data) may be performed at a higher frequency than step 108 (e.g., rendering the display data). For example, steps 118 and 120 may be performed with a frequency twice as high as the frequency of step 108. Steps 118 and 120 may be performed at a frequency of 120 Hz whereas step 108 may be performed at a frequency of 60 Hz, as one example.

Using the remote rendering operations of FIG. 2, head-mounted device 10 conserves power relative to an arrangement where all the display data is locally rendered. However, the remote rendering operations rely on wireless communications between head-mounted device 10 and electronic device 30. Unreliable network strength between head-mounted device 10 and electronic device 30 may therefore cause undesired latency in the content displayed to the user of head-mounted device.

Figure 3A:
FIG. 3A is a top view of an extended reality environment including two virtual objects in accordance with some embodiments.
Figure 3A:
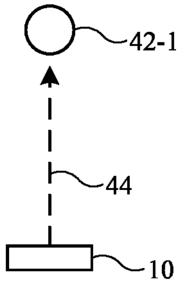
Figure 3B:
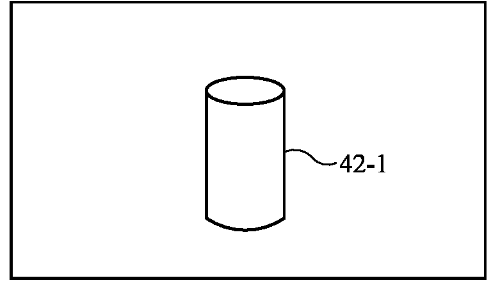
FIG. 3B is a depiction of a user's view of the extended reality environment of FIG. 3A in accordance with some embodiments.
Figure 4A:
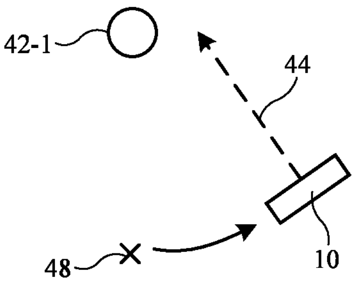
FIG. 4A is a top view of an extended reality environment including two virtual objects after a user has moved their head in a first direction relative to as in FIG. 3A in accordance with some embodiments.
Figure 4B:
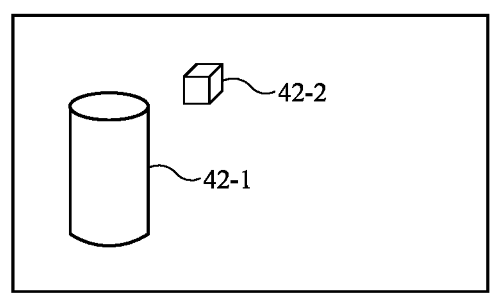
FIG. 4B is a depiction of a user's view of the extended reality environment of FIG. 4A in accordance with some embodiments.
Figure 5A:
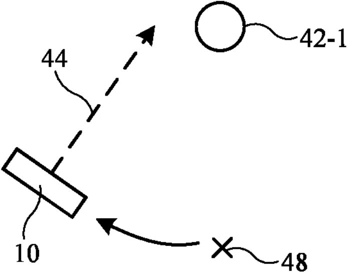
FIG. 5A is a top view of an extended reality environment including two virtual objects after a user has moved their head in a second direction relative to as in FIG. 3A in accordance with some embodiments.
Figure 5B:
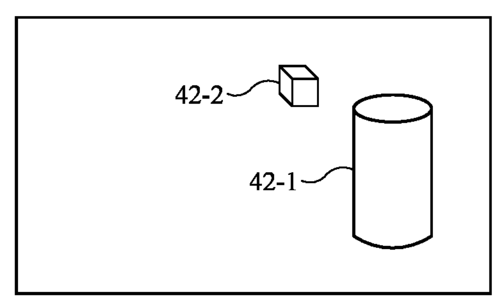
FIG. 5B is a depiction of a user's view of the extended reality environment of FIG. 5A in accordance with some embodiments.

Consider the example of FIGS. 3A, 3B, 4A, 4B, 5A, and 5B. FIGS. 3A, 4A, and 5A are top views of an extended reality (XR) environment including electronic device 10, virtual object 42-1, and virtual object 42-2. FIG. 3B is a depiction of a user's view of the XR environment of FIG. 3A while wearing head-mounted device 10. FIG. 4B is a depiction of a user's view of the XR environment of FIG. 4A while wearing head-mounted device 10. FIG. 5B is a depiction of a user's view of the XR environment of FIG. 5A while wearing head-mounted device 10.

In FIG. 3A, the head-mounted device points in direction 44 that is aligned with virtual objects 42-1 and 42-2. In other words, virtual object 42-2 may be occluded by virtual object 42-1 when the head-mounted device is positioned as in FIG. 3A. This is reflected in the user's view shown in FIG. 3B. As shown in FIG. 3B, the virtual object 42-2 is completely occluded by virtual object 42-1. Therefore, only virtual object 42-1 is visible.

FIG. 4A shows an example where the user has moved their head to the right relative to original position 48 from FIG. 3A. In this example, virtual object 42-2 is no longer occluded by virtual object 42-1. As shown in FIG. 4B, the virtual object 42-2 is visible to the right of virtual object 42-1.

FIG. 5A shows an example where the user has moved their head to the left relative to original position 48 from FIG. 3A. In this example, virtual object 42-2 is no longer occluded by virtual object 42-1. As shown in FIG. 5B, the virtual object 42-2 is visible to the left of virtual object 42-1.

In FIGS. 3A-5B, the content on the display is updated based on the user's head position so that the content appears to be fixed in three-dimensional space from the perspective of the user. This provides an immersive experience for the user but relies on low latency to avoid visible artifacts.

As an example of a visible artifact, consider an example where the user is positioned as in FIG. 4A but (due to latency) sees the view of FIG. 3B. Based on their position within the extended reality environment, the user should see both virtual objects 42-1 and 42-2 (as in FIG. 4B). However, latency causes the user to instead only see virtual object 42-1 (as in FIG. 3B).

Visible artifacts caused by latency may be mitigated by rendering auxiliary views of an extended reality environment. Rendering auxiliary views of an extended reality environment may sometimes be referred to as pre-rendering.

Again, consider the example of FIG. 3A where, at a given time, the user is only able to see virtual object 42-1. FIG. 3B shows the primary view of the virtual content in the extend reality environment. The primary view is rendered based on the predicted head pose associated with a given display frame. In a pre-rendering scheme, auxiliary views of the virtual content may also be rendered for the given display frame. For example, FIG. 4B shows a first auxiliary view and FIG. 5B shows a second auxiliary view. The first and second auxiliary views may be rendered in addition to the primary view. If, at the time of the given display frame, the user's head pose is different than the estimated head pose, the auxiliary views may be used to provide a more accurate depiction of the extended reality environment without needing to restart the rendering process. Additionally, during a subsequent display frame the user may change their head pose (as in FIG. 4A or FIG. 5A). The first and second auxiliary views associated with the new head poses are already rendered, therefore mitigating latency in the display.

In a pre-rendering scheme, it should be noted that auxiliary views may have at least one characteristic that differs when compared to the primary view. For example, the auxiliary views may be rendered with a lower resolution and/or a smaller field-of-view than the primary view.

In a remote rendering arrangement, pre-rendering may mitigate artifacts caused by latency. However, pre-rendering may require additional network bandwidth (to wirelessly transmit the auxiliary view(s) in addition to the primary view). Therefore, in some arrangements pre-rendering may only be performed when the network strength of the wireless connection between electronic devices 10 and 30 is sufficiently strong.

It should be understood that head-mounted device 10 may present both two-dimensional content and three-dimensional content to a viewer. When two-dimensional content is presented, the same (or approximately the same) image is presented to both the left eye of the user and the right eye of the user. When three-dimensional content is presented, slightly different images are presented to the left eye of the user and the right eye of the user to create the perception of depth. It is noted that, herein, the term view is used to refer to display content associated with a single user (having left and right eyes) at a single head pose. In other words, a single view may encompass slightly different images (e.g., a first image for the left eye and a second image for the right eye) that are presented to the left and right eyes to create the perception of depth (when three-dimensional content is displayed) or may encompass a single image that is presented to both the left and right eyes (when two-dimensional content is displayed). Each display frame may have an associated view that is presented to the viewer based on the head pose. Each view may have a single associated viewing angle (that is determined based on the head pose of the viewer).

Figure 6:
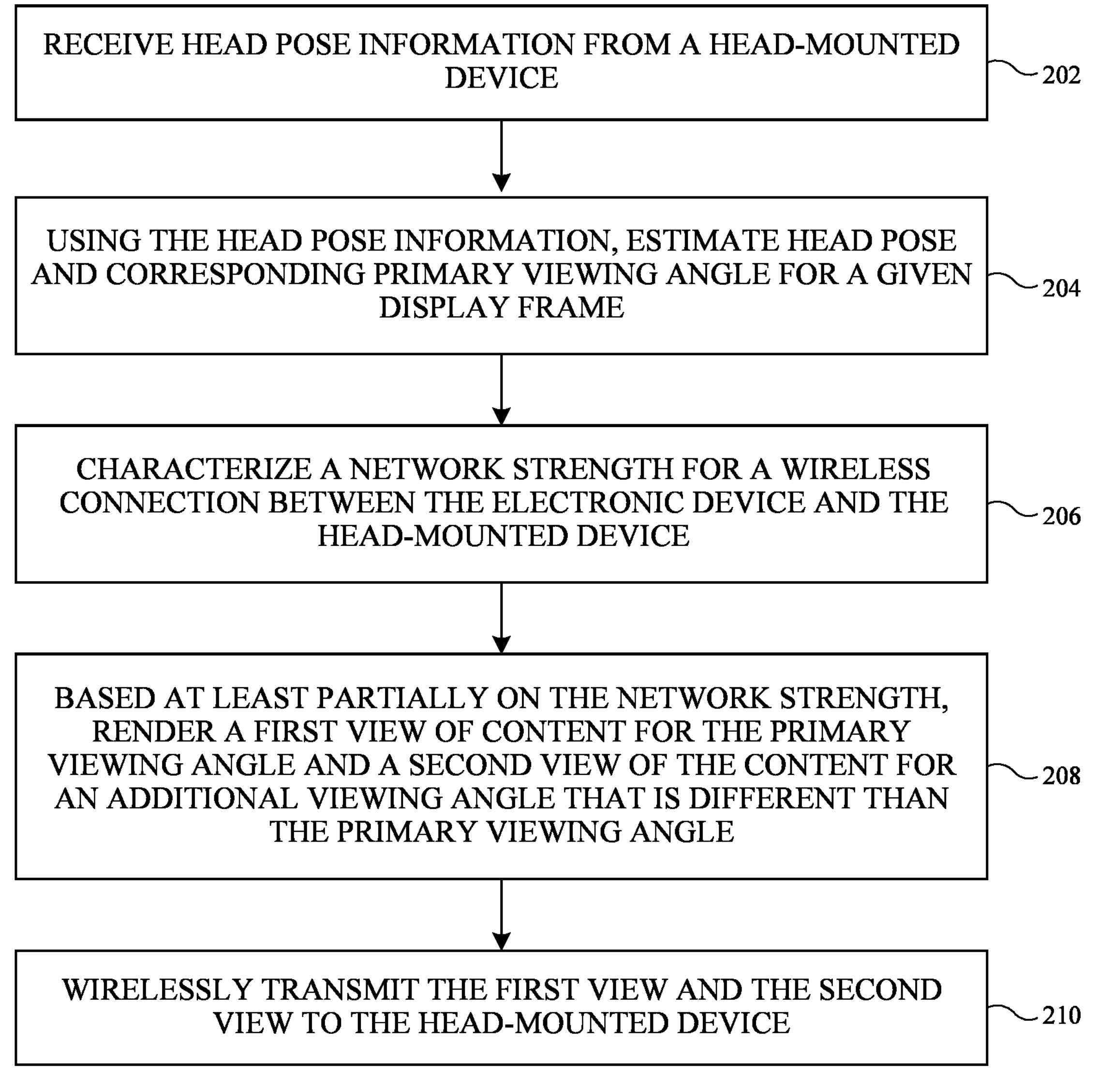
FIG. 6 is a flowchart of an illustrative method performed by an electronic device that renders auxiliary views for a paired head-mounted device based on network strength in accordance with some embodiments.

FIG. 6 is a flowchart of illustrative method steps for operating an electronic device (e.g., electronic device 30 from FIG. 1) that is paired with a head-mounted device in a remote rendering arrangement. At step 202, electronic device 30 may wirelessly receive head pose information from head-mounted device 10. At step 204, the electronic device 30 may use the head pose information from step 202 to estimate the head pose (and, correspondingly, the primary viewing angle) for a given display frame. Electronic device 30 may estimate the head pose using multiple head poses or may use the most recent head pose as the estimate for the given display frame.

At step 206, electronic device 30 may characterize a network strength for a wireless connection between electronic device 30 and head-mounted device 10. The network strength for the wireless connection between electronic device 30 and head-mounted device 10 may be characterized by a measured bit rate of transmissions from electronic device 30 to head-mounted device 10, a measured bit rate of transmissions from head-mounted device 10 to electronic device 30, and/or an expected bit rate associated with the type of wireless communications being used. As additional examples, the network strength may be measured by electronic device 30 and/or head-mounted device 10 using milliwatts (mW), decibels per milliwatt (dBm), or received signal strength indicator (RSSI). One or more additional key performance indicators (KPIs) may be assessed at step 206. For example, other factors assessed at step 206 may include packet loss rate (PLR), packet error rate (PER), latency, jitter, and/or environmental factors such clear channel assessment (CCA) and/or the detected presence of other radio-frequency (RF) devices (through the detection of beacons and/or other wireless traffic or RF emissions). Any subset of the aforementioned factors may be used to characterize network strength at step 206.

Next, at step 208, electronic device 30 may, based at least partially on the network strength and/or other information from step 206, render a first view of content for the primary viewing angle (and a corresponding primary head pose) and a second view of the content for an additional viewing angle (and a corresponding additional head pose) that is different than the primary viewing angle.

Electronic device 30 may, in general, render more auxiliary data (e.g., more additional views, higher resolution for the auxiliary view(s), larger field-of-view for the auxiliary view(s)) as the network strength increases. If network strength is insufficient for pre-rendering (e.g., if the network strength is below a given threshold), the electronic device 30 may only render a primary view for each given frame. However, if network strength is sufficient for pre-rendering (e.g., if the network strength is above a given threshold), the electronic device may render a primary view and at least one auxiliary view for each given frame.

As one example, the network strength may be compared to a first threshold and a second threshold that is greater than the first threshold. While the network strength is below the first threshold, the electronic device may only render a primary view for each given frame. While the network strength is between the first and second thresholds, the electronic device may render a primary view and two auxiliary views for each given frame. While the network strength is greater than the second threshold, the electronic device may render a primary view and four auxiliary views for each given frame.

As another example, the network strength may be compared to a first threshold and a second threshold that is greater than the first threshold. While the network strength is below the first threshold, the electronic device may only render a primary view for each given frame. While the network strength is between the first and second thresholds, the electronic device may render a primary view and two auxiliary views at a first resolution for each given frame. While the network strength is greater than the second threshold, the electronic device may render a primary view and two auxiliary views at a second resolution that is greater than the first resolution for each given frame. The first resolution may be lower than the resolution of the primary view. The second resolution may be lower than or equal to the resolution of the primary view.

As another example, the network strength may be compared to a first threshold and a second threshold that is greater than the first threshold. While the network strength is below the first threshold, the electronic device may only render a primary view for each given frame. While the network strength is between the first and second thresholds, the electronic device may render a primary view and two auxiliary views with a first field-of-view for each given frame. While the network strength is greater than the second threshold, the electronic device may render a primary view and two auxiliary views with a second field-of-view that is larger than the first field-of-view for each given frame. The first field-of-view may be smaller than the field-of-view of the primary view. The second field-of-view may be smaller than or equal to the field-of-view of the primary view.

To summarize, the number of auxiliary views rendered at step 208 may vary as a function of network strength. In addition, the resolution, field-of-view, and/or other desired characteristics of each auxiliary view may vary as a function of network strength.

If desired, the number and type of auxiliary views rendered at step 208 may depend on the type of content intended to be displayed. For example, if the content is head-locked content then the view of the content is not dependent on head pose. In this case, auxiliary views may not be necessary. Electronic device 30 may therefore forego rendering auxiliary views of head-locked content.

The example of varying the number of auxiliary views and/or the resolution, field-of-view, and/or other desired characteristics of each auxiliary view as a function of network strength at step 208 is merely illustrative. Instead or in addition, the number of auxiliary views and/or the resolution, field-of-view, and/or other desired characteristics of each auxiliary view may be varied as a function of power consumption considerations (e.g., meeting power consumption targets) and/or thermal considerations (e.g., meeting thermal targets).

At step 210, the first view and the second view may be wirelessly transmitted to the head-mounted device. Similar to as shown in step 110 of FIG. 2, display data for the first view and the second view may be compressed before wireless transmission if desired.

Figure 7:
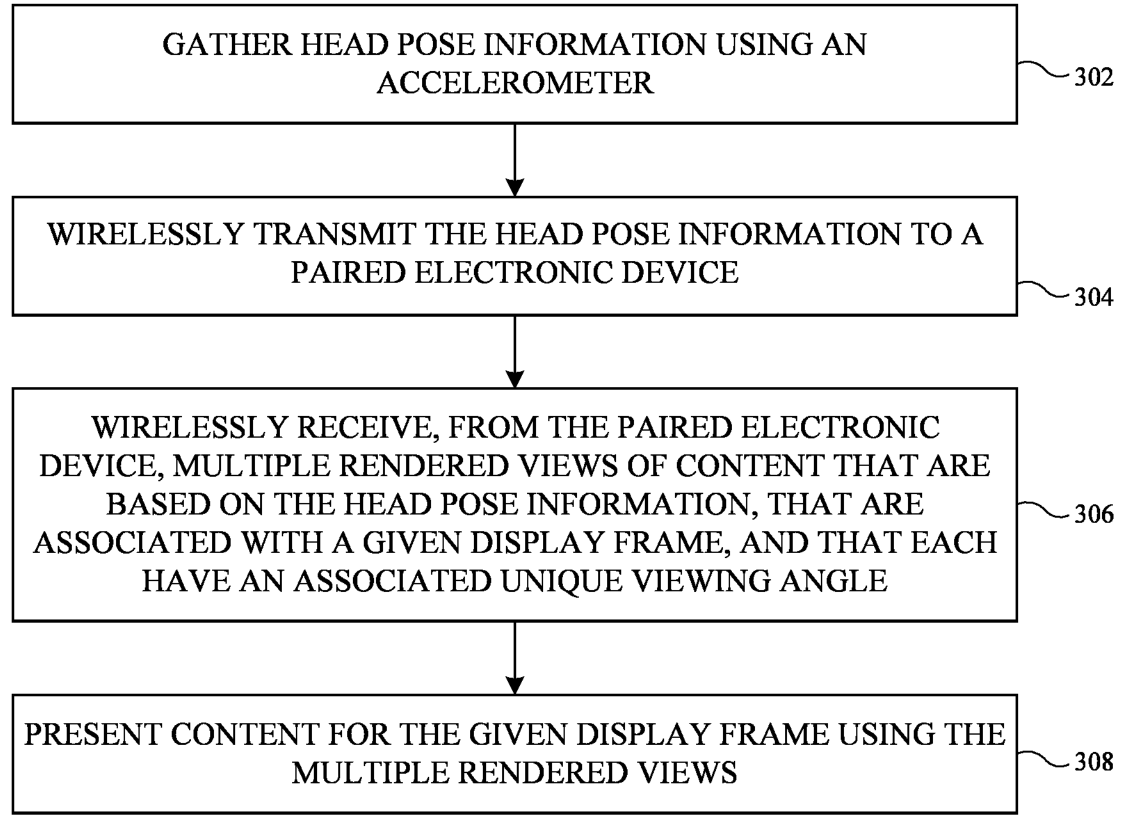
FIG. 7 is a flowchart of an illustrative method performed by a head-mounted device that receives auxiliary views from a paired electronic device in accordance with some embodiments.

FIG. 7 is a flowchart of illustrative method steps for operating a head-mounted device (e.g., head-mounted device 10 from FIG. 1) that is paired with an electronic device in a remote rendering arrangement. At step 302, head-mounted device 10 may gather head pose information using an accelerometer or any other desired position and motion sensors 22. At step 304, the head-mounted device 10 may transmit head pose information to electronic device 30. The head-mounted device may transmit a single head pose for a single point in time or multiple head poses associated with different points in time. In other words, the head-mounted device 10 may transmit one or more head poses, with each head pose having a corresponding time stamp.

At step 306, the head-mounted device 10 may wirelessly receive, from the paired electronic device 30, multiple rendered views of content that are based on the head pose information. Each view may be associated with a single given display frame and each view may have an associated unique viewing angle. As an example, a first view of the multiple rendered views may be rendered for a first head pose and a second view of the multiple rendered views may be rendered for a second head pose that is different than the first head pose. One of the multiple rendered views received at step 306 may be a primary view for a primary viewing angle. The primary view may have a resolution and field-of-view. The other views received at step 306 may be referred to as auxiliary views for auxiliary viewing angles. The auxiliary views may optionally have a lower resolution and/or a smaller field-of-view than the primary view. Each one of the multiple views received at step 306 may comprise a first image for a left eye and a second image for a right eye.

At step 308, head-mounted device 10 may present content for the given display frame using the multiple rendered views. As one example, presenting the content for the given display frame using the multiple rendered views may include presenting one view of the multiple rendered views during the given display frame. For example, if the head-mounted device 10 determines that the head pose associated with the primary view received at step 306 is accurate, the primary view may be displayed at step 308. As another example, the head-mounted device 10 may determine that the head pose associated with the primary view received at step 306 is inaccurate and the head pose for the given frame instead matches a head pose associated with a first auxiliary view. In this case, the first auxiliary view may be displayed at step 308.

As another example, head-mounted device 10 may receive a first view for a first head pose and a second view for a second head pose at step 306. At step 308, head-mounted device may estimate that the head-mounted device will have a third head pose that is between the first and second head poses during the given frame. In this case, the first and second views may be interpolated to generate an interpolated view that is subsequently presented on the display at step 308.

As yet another example, head-mounted device 10 may receive, for a first frame, a first view for a first head pose and a second view for a second head pose at step 306. The head-mounted device 10 may confirm that the head pose associated with the first view is accurate and therefore may display the first view during the given frame. However, during the next frame after the given frame (e.g., an immediately subsequent frame), an interruption in wireless communications results in no views being received from the paired electronic device 30. The head-mounted device 10 may estimate that the device will have the second head pose during the immediately subsequent frame. Accordingly, the head-mounted device may display the second view during the immediately subsequent frame. In this case, the content of the immediately subsequent frame may be one frame out-of-date. However, the perspective of the immediately subsequent frame will match the real time head pose of the user, mitigating the detectability of the out-of-date frame.

Examples are described herein regarding head pose prediction and choosing one or more auxiliary views in addition to a primary view. It is noted that the head pose prediction and choice of auxiliary views may depend on a variety of factors. These include the nature of the content being rendered, the position of the user relative to their environment, the current motion of the user (e.g. walking versus standing or sitting), whether the user is in the vicinity of other users or engaged with other users, as well as historical data that has been amassed about both that specific user as well as user habits over a wider population. In terms of the nature of the content, properties like the complexity of the content, whether the content is head-locked, body-locked, or world-locked, and the placement of the content relative to both the physical and virtual environment may also play a role in determining how additional views are rendered or how content being sent over the link is adjusted.

To that end, the head pose information transmitted from head-mounted device 10 to electronic device 30 (e.g., at step 102 in FIG. 2, at step 304 in FIG. 7, etc.) may include, in addition to accelerometer data from position and motion sensors 22, additional information that may impact the head pose prediction. The additional information may include information regarding the position of the user relative to their environment, the current motion of the user (e.g. walking versus standing or sitting), whether the user is in the vicinity of other users or engaged with other users, etc.

If desired, one or both of control circuitry 14 in electronic device 10 and control circuitry 34 in electronic device 30 may include a trained model. The trained models may optionally be large language models. A large language model (LLM) is an artificial intelligence system designed to understand and generate human language text. Large language models (LLMs) belong to the broader category of natural language processing (NLP) models and have the ability to process and generate text that is coherent, contextually relevant, and grammatically accurate. Large language models may be built using deep learning techniques (e.g., neural networks) which enable them to learn patterns and associations within vast amounts of textual data. LLMs are trained on datasets containing billions of words, which allows them to capture the nuances and complexities of human language. Large language models are characterized by their large scale (e.g., having a least one hundred million parameters, having at least one billion parameters, at least ten billion parameters, at least one hundred billion parameters, etc.).

The trained models in control circuitry 14 and/or 30 may therefore sometimes be referred to as artificial intelligence (AI) systems, language models, large language models, natural language processing models, etc. The trained models may include at least one billion parameters, at least ten billion parameters, at least one hundred billion parameters, etc.

A trained model in control circuitry 34 of electronic device 30 may perform a wide variety of functions. FIG. 6 shows how electronic device 30 may render different views of content at different viewing angles based at least partially on the network strength. The rendering of the different views of content at different viewing angles may be performed by the trained model in control circuitry 34. As another example, the trained model in control circuitry 34 may receive various information from head-mounted device 10 such as user hand and/or matting information, room reconstruction information such as a three-dimensional mesh and/or semantic data, object detection information, target style information, etc. Using this received information, the trained model in control circuitry 30 may perform a style transfer (where a scene is modified to suit a particular style).

A trained model in control circuitry 14 may perform a wide variety of functions. FIG. 7 shows how electronic device 10 may present content for a given display frame using multiple rendered views at different viewing angles associated with that display frame. If desired, the rendering of the given display frame using the multiple rendered views may be performed by the trained model in control circuitry 14. The trained model may generate a view at a viewing angle that is different than the viewing angles of the rendered views received from electronic device 30. The trained model may perform hole filling operations (e.g., rendering data for obstructed portions of a scene where no rendered data has yet been received from the multiple received views) to render content for the given frame. The trained model may receive rendered views from electronic device 30 at a first frame rate and may output a video stream using a second frame rate that is greater than the first frame rate.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A method of operating an electronic device that is configured to wirelessly communicate with a head-mounted device, the method comprising:
for a display frame, rendering a first view of content for a primary viewing angle;
for the display frame, rendering a second view of the content for an additional viewing angle that is different than the primary viewing angle; and
wirelessly transmitting the first view and the second view to the head-mounted device, wherein the first view of the content has a first field-of-view, wherein the second view of the content has a second field-of-view, and wherein the second field-of-view is smaller than the first field-of-view.

2. The method defined in claim 1, further comprising:
wirelessly receiving head pose information from the head-mounted device.

3. The method defined in claim 2, further comprising:
predicting the primary viewing angle based on the head pose information.

4. The method defined in claim 2, further comprising:
determining the primary viewing angle using a most recent head pose from the head pose information.

5. The method defined in claim 1, wherein the first view of the content has a first resolution, wherein the second view of the content has a second resolution, and wherein the second resolution is lower than the first resolution.

6. The method defined in claim 1, further comprising:
before wirelessly transmitting the first view and the second view for the display frame to the head-mounted device, compressing the first view and the second view.

7. The method defined in claim 1, wherein the electronic device comprises a trained model, wherein rendering the first view of content for the primary viewing angle comprises rendering the first view of content using the trained model, and wherein rendering the second view of the content for the additional viewing angle comprises rendering the second view of the content using the trained model.

8. A method of operating an electronic device that is configured to wirelessly communicate with a head-mounted device, the method comprising:
for a display frame, rendering a first view of content for a primary viewing angle;
for the display frame, rendering a second view of the content for an additional viewing angle that is different than the primary viewing angle;
wirelessly transmitting the first view and the second view to the head-mounted device; and
characterizing a network strength for a wireless connection between the electronic device and the head-mounted device, wherein rendering the second view of the content for the additional viewing angle comprises rendering the second view based at least partially on the network strength.

9. The method defined in claim 8, wherein rendering the second view based at least partially on the network strength comprises rendering the second view in response to the network strength exceeding a threshold.

10. A method of operating an electronic device that is configured to wirelessly communicate with a head-mounted device, the method comprising:
for a first display frame and while a wireless connection between the electronic device and the head-mounted device has a first strength:
rendering only a single view of content; and
wirelessly transmitting the single view of the content to the head-mounted device; and
for a second display frame and while the wireless connection between the electronic device and the head-mounted device has a second strength that is greater than the first strength:
rendering multiple views of the content; and
wirelessly transmitting the multiple views of the content to the head-mounted device.

11. The method defined in claim 10, further comprising:
wirelessly receiving head pose information from the head-mounted device.

12. The method defined in claim 11, further comprising:
predicting a viewing angle for the first display frame based on the head pose information, wherein the single view of content is for the viewing angle.

13. The method defined in claim 11, further comprising:
predicting a first viewing angle for the second display frame based on the head pose information, wherein a first view of the multiple views of content is for the first viewing angle and wherein a second view of the multiple views of content is for a second viewing angle that is different than the first viewing angle.

14. The method defined in claim 13, wherein the first view has a first resolution, wherein the second view has a second resolution, and wherein the second resolution is lower than the first resolution.

15. The method defined in claim 13, wherein the first view has a first field-of-view, wherein the second view has a second field-of-view, and wherein the second field-of-view is smaller than the first field-of-view.

16. The method defined in claim 10, further comprising:
before wirelessly transmitting the multiple views of the content to the head-mounted device, compressing at least one of the multiple views.

* * * * *